(12) United States Patent
Roth

(10) Patent No.: US 7,386,505 B1
(45) Date of Patent: Jun. 10, 2008

(54) SYSTEM AND METHOD FOR AUTOMATED COMPLIANCE WITH LOAN LEGISLATION

(75) Inventor: Jason A. Roth, San Francisco, CA (US)

(73) Assignee: LogicEase Solutions, Inc., Burlingame, CA (US)

( * ) Notice: Subject to any disclaimer, the term of this patent is extended or adjusted under 35 U.S.C. 154(b) by 1233 days.

(21) Appl. No.: 10/609,721

(22) Filed: Jun. 30, 2003

(51) Int. Cl.
*G06Q 40/00* (2006.01)
(52) U.S. Cl. .......................................... 705/38; 705/35
(58) Field of Classification Search .............. 705/30–42
See application file for complete search history.

(56) References Cited

U.S. PATENT DOCUMENTS

| | | | |
|---|---|---|---|
| 6,985,886 B1* | 1/2006 | Broadbent et al. | 705/38 |
| 7,016,874 B2* | 3/2006 | Rorimer | 705/37 |
| 2001/0047326 A1 | 11/2001 | Broadbent et al. | 705/38 |
| 2002/0120642 A1 | 8/2002 | Fetherston | 707/500 |

\* cited by examiner

*Primary Examiner*—Frantzy Poinvil
(74) *Attorney, Agent, or Firm*—Womble Carlyle Sandridge & Rice, PLLC

(57) ABSTRACT

A computer-based system and method, and a computer readable medium comprising software, for automatically determining whether a financial transaction, such as a mortgage loan must and does comply with relevant legislation. Stored business rules determine whether the financial transaction comply with relevant legislation using phraseology used by the relevant legislation. A knowledge base stores mappings of business rules corresponding to transaction objects representing the financial transaction. An application database includes the terms of the financial transaction and other information necessary to make compliance determinations. A natural language processor generates programming code comprised of programming concepts, which implements the business rules. A rule engine executes the programming code and maps the programming concepts to functions that are associated with a transaction object representing the financial transaction. An application server instantiates a transaction object representing the given financial transaction based on the stored terms of the financial transaction, executes functions are associated with the transaction objects so that the rule engine can make a compliance determination. The application server also outputs findings reports with the compliance determinations, including reasons for the finds that are stored in a reason test database.

72 Claims, 7 Drawing Sheets

Concepts

| Word | Part of Speech | Type |
|---|---|---|
| APR | Noun | Real Number |
| Prime rate | Noun | Real Number |
| Loan | Noun | Object |

Relations

| Phrasing | Mapping to Application Server |
|---|---|
| the APR of the loan | loan.getApr() |
| the prime rate as of the closing date of the loan | loan.getPrime() |
| a real number exceeds a real number | isGreaterThan(x, y) |

Figure 4

| SUMMARY FINDINGS | |
|---|---|
| Federal Regulations | |
| High Cost Mortgage | YES |
| APR Threshold Test | FAIL |
| Points and Fees Threshold Test | PASS |
| Balloon Payment Test | N/A |
| Legislative Summary | ALERT |

Figure 5

| DETAILED FINDINGS |
|---|

Federal Regulations

High Cost Mortgage     YES
The loan is a high-cost mortgage because it has terms that exceed the APR or Points and Fees Threshold.

APR Threshold Test     FAIL
The APR is 11.56%, which exceeds the prime rate as of consummation, 1.25%, plus 10 percentage points.

Points and Fees Threshold Test     PASS
The total points and fees according to the Federal definitions is $1000.00, which does not exceed 8% of $101,000, the total loan amount of the mortgage.

Balloon Payment Test     N/A
The balloon payment test is not applicable to the loan because the maturity term is in excess of 36 months.

Legislative Summary     ALERT
Because the loan is high-cost, delivery of an additional disclosure to the borrower is required by law.

Figure 7

SYSTEM AND METHOD FOR AUTOMATED COMPLIANCE WITH LOAN LEGISLATION

TECHNICAL FIELD

This invention relates to a computer-based system and method, and a computer readable medium comprising software, for automated determination of compliance with legislation governing financial transactions, such as mortgage loans.

BACKGROUND

Legislation affecting an industry, such as the financial services industry, are often enacted at various governmental levels, including, federal, state and municipal or county levels. For example, in 1994, the United States Congress enacted the Federal Home Ownership and Equity Protection Act, which regulated the making of mortgage loans.

Traditionally, compliance with legislation affecting the financial services industry was determined either manually or by a specially developed computer program. In either case, compliance with relevant legislation is determined by comparing the terms of a given financial transaction, such as a loan, with the requirements and restrictions of the relevant legislation. Known computer based approaches to determining compliance with legislation use traditional, procedural programming languages, wherein compliance is determined in a "linear" fashion, that is, a series of sequential conditions that are evaluated. After every possible condition is evaluated, the results of the evaluations are output.

A disadvantage of such a "linear" programming approach is that for every financial transaction to be analyzed, the program must run from the beginning to the end, and many conditions that are not relevant to determining whether the given financial transaction complies with the relevant legislation are nevertheless evaluated. Such an approach consumes more computing resources, including processing time and memory, than is necessary.

Another disadvantage of such a linear approach is that the relevant legislation, which is generally comprised of a set of rules, must be translated into a sequential computer program. Translating the legislation into a sequential computer program requires substantial modifying of the general framework of the legislation from a system of rules to a sequential computer program comprised of multiple branching decision points.

There are known computer based approaches that employ rules-based programming. Such known rules-based programming approaches, however, require that the language of the legislation itself be translated into the syntax of the rules-based computer programming language.

Thus, there is a need in the art for a computer based approach to determining whether a given financial transaction complies with relevant legislation that does not have the disadvantages of the known approaches.

SUMMARY OF THE INVENTION

A computer-based system and method, and a computer readable medium comprising software, for automatically determining whether a given financial transaction, such as a mortgage loan must, and does comply, with relevant legislation. The system includes a storage subsystem having at least one business rule. The business rule determines whether the given financial transaction must comply with relevant legislation using substantially the same phraseology used by the relevant legislation. The storage subsystem also includes a knowledge base. The knowledge base stores mappings of each of the business rules corresponding to one or more transaction objects representing the given financial transaction. The storage system also includes an application database, which includes the terms of the given financial transaction, and other information, such as prime rate information, necessary to determine whether the given financial transaction must comply with the relevant legislation. The terms of the financial transaction stored in the application database may include a loan amount, an annual percentage rate ("APR"), a loan term, points, fees, a designation as to whether points and/or fees are prepaid or financed, a location of property securing the loan, an application date of the loan, a closing date of the loan, a funding date of the loan, late fees, grace period, maturity length or balloon payment, prepayment term, prepayment penalties, application date, property type, loan purpose and one or more disclosure delivery dates.

The system also includes a natural language processor that generates programming code comprised of one or more programming concepts. The programming code that implements the business rules is stored in the storage subsystem.

The system further includes a rule engine that executes the programming code generated by the natural language processor. The rule engine also maps each of the programming concepts to the functions that are associated with a transaction object representing the given financial transaction.

The system also includes an application server that instantiates a transaction object representing the given financial transaction based on the terms of the financial transaction that are stored in the application database. The application server also executes the functions that are associated with the transaction objects so that the rule engine can make a determination as to whether the given transaction must and does comply with the relevant legislation. The application server also outputs a determination as to whether the given financial transaction must and does comply with the relevant legislation.

In operation, the determination as to whether the mortgage loan must comply with the relevant legislation is based on an assignment of the mortgage loan to one or more classifications included in the relevant legislation. One such classification may be a restricted or "high cost" mortgage loan.

The system generates output that consists of a report indicating whether the loan is a restricted or high cost mortgage loan. The system may classify the loan as restricted if the annual percentage rate for the loan is greater than an annual percentage rate threshold specified by the relevant legislation. Alternatively, the loan may be classified as a restricted mortgage loan if the points and fees for the loan are greater than a points and fees threshold established by the relevant legislation. If the system classifies the loan as a restricted mortgage loan, the system also outputs an indication that additional information must be disclosed to the borrower.

The system also identifies requirements established by the relevant legislation that must be met by a lender making the restricted mortgage loan and whether such requirements are satisfied. For example, the relevant legislation may provide that the term of the restricted mortgage loan cannot be less than a predetermined term threshold. The system determines whether the term of the restricted mortgage loan is less than the predetermined term threshold, and outputs a report indicating whether the term of the restricted mortgage loan is less than the predetermined term threshold established by the relevant legislation. Other requirements that might apply to a mortgage loan classified as a restricted or high cost mortgage may include that the lender cannot finance fees in excess of a certain predefined percentage of the loan amount. Other requirements may be that the prepayment term cannot exceed a predetermined number of months, the borrowers debt-to-income ratio cannot exceed a predetermined percentage, the lender cannot finance any single-premium credit insurance, the grace period for late payment cannot be less than a predetermined number of days and late fees cannot exceed a predetermined percentage of the loan amount and/or the monthly payment.

The storage subsystem may also include a reason text database, and the system output can include reasons for the determinations made by the system.

The system determines the legislation that is relevant to a given financial transaction, such as a loan, based on the location of property securing the loan, the application date of the loan or the closing date of the loan.

DESCRIPTION OF DRAWINGS

FIG. 4 illustrates the relationships between the English business rules, the programming concepts and the corresponding functions executed by the application server.

FIG. 5 illustrates the output of the application server in the form of an exemplary summary findings report.

FIG. 7 illustrates an exemplary detailed findings report that is generated by the application server using the reason text database.

DETAILED DESCRIPTION

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

Overview

The present invention improves the efficiency and accuracy of determining whether a given financial transaction, such as a loan, complies with one or more pieces of relevant legislation. Generally, rules embodied in the relevant legislation are expressed as English business rules and stored. A natural language processor generates rule-based programming code comprising programming concepts. A rule engine executes the programming code and maps each programming concept to function executed on an application server.

After the relevant legislation has been codified by the system, the terms of the financial transaction, such as a loan, to be analyzed are received via a known document format. An application server accesses to the terms of the loan, interfacing directly with the data in the loan document format and acting as a bridge to the rule engine. Upon receiving the terms of the loan, the rule engine system executes the English language rules and determines whether the loan must and does comply with the relevant legislation. The application server generates output of the compliance determinations reached by the rule engine.

As can be appreciated, the system can be used by a loan originator on a day-to-day basis to analyze loans on either a "pre-close" or "post-close" basis. The system also can be used to analyze loans that have already closed for auditing and/or due diligence.

Each of the components of the system will now be discussed in enabling detail.

Storage Subsystem

Figure 1:
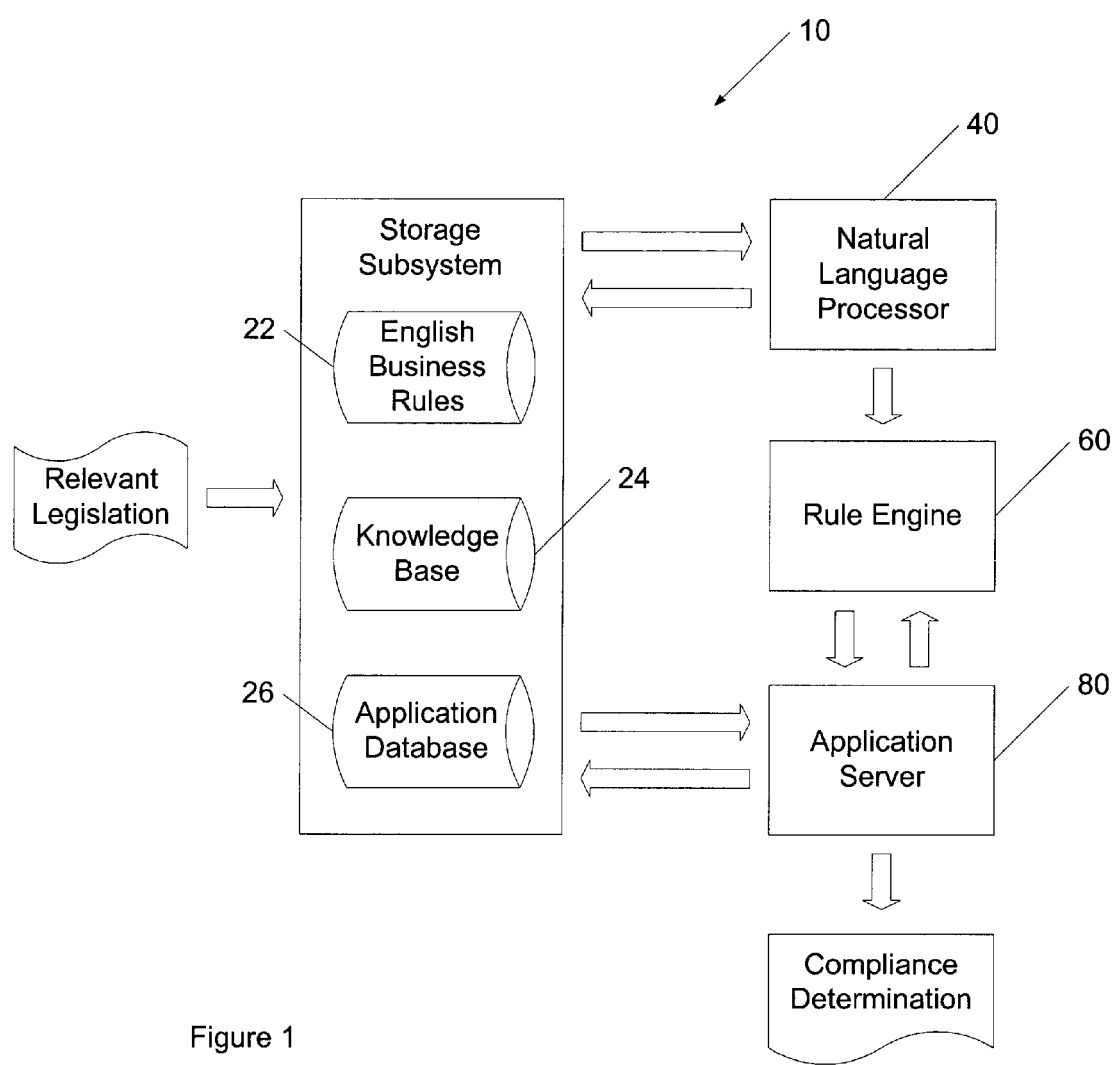
FIG. 1 is a diagram of the system of the present invention.

The present invention improves the efficiency and accuracy of determining whether a given financial transaction, such as a loan, complies with one or more pieces of relevant legislation. As shown in FIG. 1, the system 10 includes a storage subsystem 20 for storing business rules 22, a knowledge base 24 and an application database 26.

The business rules 22 encode the relevant legislation using substantially the same vocabulary, or phraseology, used by the relevant legislation, as well as relations between the vocabulary elements. This advantageously allows for construction of business rules that correspond to the vocabulary, or phraseology of the relevant loan-related legislation. Such business rules are sometimes referred to "English language" business rules. As can be appreciated, however, the invention is not limited to the use of English language phraseology. Rather, the phraseology used should correspond to the language in which the relevant legislation is originally written.

It should be noted that "legislation" means the statutory laws passed by a legislative body, such as the United States Congress or a state, municipal or county legislature, as well as rules and regulations that have the force of law.

The knowledge base 24 includes a mapping for each of the business rules to one or more transaction objects representing the given financial transaction. The mappings are stored in the knowledge base.

The application database 26 includes terms of the given financial transaction and other information that is necessary to determine whether the given financial transaction must comply with the relevant legislation. The terms of the given financial transaction, such as a loan, can be encapsulated within various known document formats. Exemplary document formats include the DU3 format developed by Fannie Mae and the XML document specifications developed by the Mortgage Industry Standards Maintenance Organization. As known to those skilled in the art, XML, or Extensible Markup Language, XML (Extensible Markup Language) is a flexible way to create common information formats and share both the format and the data on the World Wide Web, intranets, and elsewhere in a consistent way. Other information necessary to determine whether the given financial transaction complies with the relevant legislation can include the prime rate and certain thresholds established by the relevant legislation, which are discussed in more detail below.

Natural Language Processor

Returning to FIG. 1, the system 10 also includes a natural language processor 40. Generally, a natural language processor can translate English sentences into rules in a rule-based artificial intelligence computer programming language that can be run by a rule engine. In the present invention, the natural language processor 40 generates programming code comprised of one or more programming concepts. The programming code implements the English language business rules and is stored in the storage subsystem 20. The inputs to the natural language processor include the mapping information stored in the knowledge base and the English language business rules. Examples of suitable natural language processors include Blaze Advisor available from Fair Isaac Corporation of San Rafael, Calif., and Authorete available from The Haley Enterprise of Sewickley, Pa., which is preferred. As discussed in more detail below, the natural language processor can interface with an application server that the can execute code in any number of programming languages, including object oriented programming languages, such as Java and C++.

Rule Engine

Returning to FIG. 1, the system also includes a rule engine 60. The rule engine 60 executes the programming code generated by the natural language processor. The rule engine 60 also maps each of the programming concepts, which are encoded in the programming code generated by the natural language processor 40, to the functions that are associated with a transaction object that represents the given financial transaction. Examples of commercially available rule engines that are suitable for use in connection with the present invention include the Blaze Decision System by Fair Isaac Corporation and the CIA Server by The Haley Enterprise.

The rules are written in a rules-based artificial intelligence computer programming language, such as CLIPS. As is known to those skilled in the computer programming arts, CLIPS is an acronym for C Language Integrated Production System. CLIPS is a development and delivery expert system tool for the construction of rule and/or object based expert systems. CLIPS is available from GHG Corporation of Houston, Tex.

Application Server

Returning again to FIG. 1, the system 10 further includes an application server 80. The transaction objects are instantiated based on the terms of the given financial transaction, which are stored in the application database 26. The application server 80 also executes one or more functions that are associated with the transaction objects so that the rule engine 60 can make, and then output, a determination as to whether the given transaction must comply with the relevant legislation. Exemplary application servers that can execute the programming code generated by the rule engine include Resin, which is an XML application server that is available from Caucho Technology, Inc. of La Jolla, Calif., and WebLogic Server, which is a web server that is available from BEA Systems, Inc. of San Jose, Calif.

In an embodiment, the application server 80 runs on a first computer while the rule engine 60 runs on a second computer so that the rule engine 60 can access the transaction objects and functions on the application server 80. Thus, the rule engine 60 can execute functions and access data via the application server 80.

Determinations made by the rule engine 60 are then communicated back to the application server 80 via system memory, if the rule engine and the application server are installed on the computer, or via communication across a network, if they are installed on two different computers. The application server 80 outputs the determinations by the rule engine as findings in a report format that can be displayed, printed, or archived. The report format can be any format that is suitable for the application intended for the report, such as the XML format or the portable document format ("PDF") developed by Adobe Systems Incorporated of San Jose, Calif.

The report may contain both summary and detail information concerning the decisions arrived at by the rule engine 60. The application server 80 generates the report, based on the decisions arrived at and communicated to it by the rule engine 60. The summary portion of the report may contain the status for each quantifiable test as well as the categories for which additional "alerts" are available, which are discussed in more detail below. The detail portion of the report may include the results of calculations performed by the rule engine 60 and by the application server 80, as well as other information used by the system in conjunction with each decision. The detailed report text may also include reason text, which provides information as to why the rule engine 60 arrived at certain decisions. In contrast, the summary section simply contains information as to each decision and the associated status.

Figure 2:
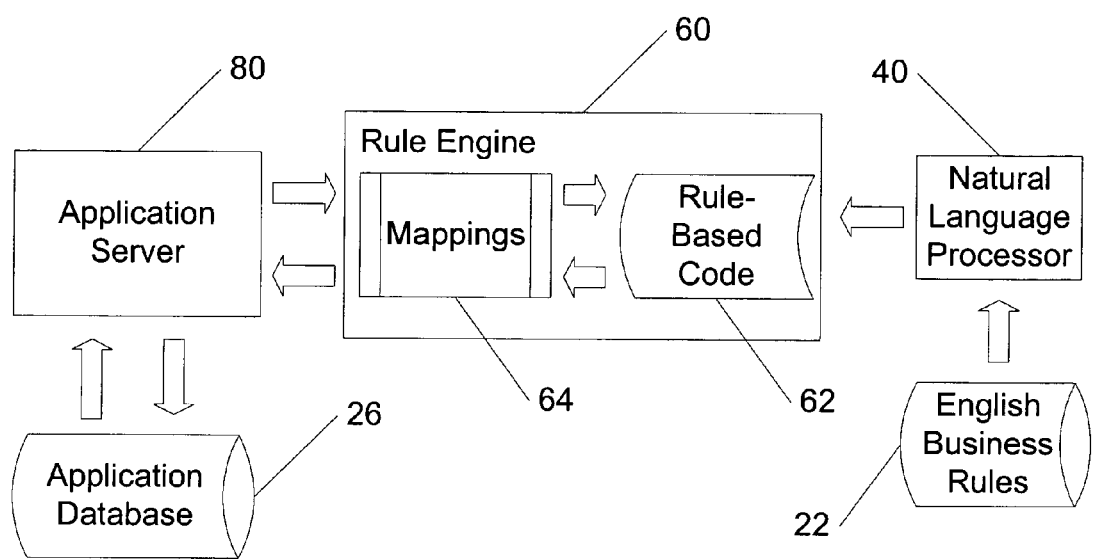
FIG. 2 is a diagram of the interaction between the application server and the rule engine of the system of the present invention.

Referring to FIG. 2, the rule engine 60, and the interaction between the application server 80 and the rule engine 60, is illustrated in more detail. The terms of the given financial transaction, and other information necessary to determine whether the given financial transaction must and does comply with the relevant legislation, which will be discussed in more detail below, is stored in an application database 26. The application database 26, which is accessible by the application server 80, can be logically considered part of the storage subsystem 20. As can be appreciated, however, the application database 26 may or may not be physically stored on the same medium as the business rules 22 and/or the knowledge base 24. In FIG. 2, the business rules 22 and the knowledge base 24 are not shown so that the interaction between the rule engine 60 and the application server 80 can be more clearly illustrated.

As mentioned above, the terms of the given financial transaction, and other information necessary to determine whether the given financial transaction must and does comply with the relevant legislation may be stored in the application database 26. As can be appreciated, any of the terms of the given financial transaction, which may include a loan amount, an annual percentage rate ("APR"), a loan term, points, fees, a designation as to whether points and/or fees are prepaid or financed, a location of property securing the loan, an application date of the loan, a closing date of the loan, a funding date of the loan, late fees, grace period, maturity length or balloon payment, prepayment term, prepayment penalties, application date, property type, loan purpose and various disclosure delivery dates, may be stored in the application database 26. As can also be appreciated any other information necessary to determine whether the given financial transaction must and does comply with relevant legislation, such as, the prime rate, treasury security yields, the borrower's debt-to-income ratio, fees that are prohibited from being financed, points and fees definitions, and thresholds established by the relevant legislation that cannot be exceeded, such as maximum annual percentage rate, maximum points, maximum fees, maximum late fees, minimum maturity, maximum financed fees, maximum prepayment term, maximum borrower debt-to-income ratio and minimum grace period, may also be stored in the application database 26.

Returning to FIG. 2, the rule engine 60 is illustrated in more detail. As can be in FIG. 2, the rule engine 60 executes the programming code 62 generated by the natural language processor 40. As mentioned previously, the natural language processor 40 generates the programming code based on the English business rules 22. The rule engine 60 also may include mappings 64 of each programming concept to a function that is performed by the application server 80, the function being associated with a transaction objection representing the given financial transaction. The transaction object is instantiated by the application server 80 based on the terms of the give financial transaction that are stored in the application database 26.

Figure 3:
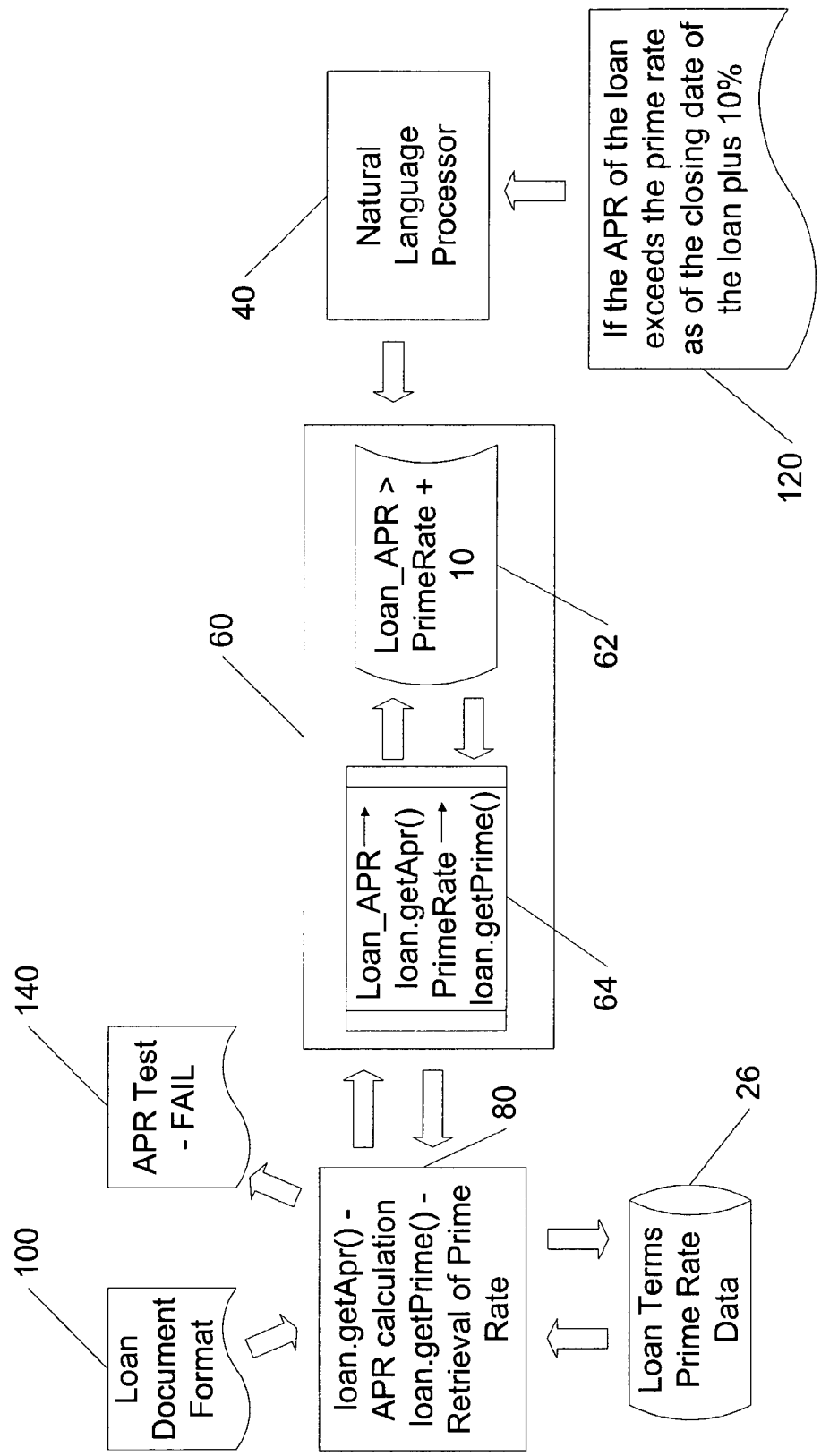
FIG. 3 is a diagram of the method in which a findings report would be generated by the system based on the terms of a loan that are encapsulated in a document format

FIG. 3 illustrates an example of a method by which the system 10 automatically determines whether a given financial transaction, in this case, a mortgage loan, must comply with relevant legislation. In the example, the relevant legislation is legislation pertaining to "high cost" mortgage loans. Generally, a "high cost" mortgage loan is a mortgage loan having an annual percentage rate or total points and fees in excess of maximum thresholds established by the relevant legislation. The relevant legislation may have other tests, instead of or in addition to an annual percentage rate test or points and fees test, to determine whether the given loan is required to comply with the relevant legislation.

As can be appreciated, because of the rule-based nature of the present invention, the system and method also can be configured to determine compliance with non-legislative procedures and polices of the loan originator, for example. Of course, once the system determines whether a given financial transaction must comply with the relevant legislation, it then determines whether the given financial transaction does, in fact, comply with the relevant legislation.

In the example illustrated in FIG. 3, the system determines whether the given loan is required to comply with the relevant legislation by determining whether the loan's annual percentage rate exceeds a predetermined maximum annual percentage rate specified by the relevant legislation. As can be appreciated, however, the same method can be used to automatically determine whether the loan must and does comply with any other requirement imposed by the relevant legislation, and the invention is in no way intended to be construed as being limited to the particular example discussed herein.

Referring to FIG. 3, the terms of the loan to be analyzed for compliance with relevant legislation are stored in a particular loan document format 100, such as an XML A function running on the application server 80 accesses the terms of the loan as data input via the loan document format 100. The terms of the loan are stored in the application database 26.

FIG. 4 illustrates in more detail the relationships between the English business rules and the programming concepts, and the rule engine's mapping of the programming concepts to the corresponding functions executed by the application server. For example, the word APR is designated as a noun concept that represents a real number data type. Similarly, Prime rate is a noun concept that refers to a real number data type. The Loan concept, which is also a noun concept, will be mapped to a particular transaction object instantiated by the application server. Thus, the Loan concept is an object data type rather than a real number data type.

An English business rule 120 is used to determine whether the loan must comply with relevant legislation is conditional, and is as follows:

If the APR of the loan exceeds the prime rate as of the closing date of the loan plus 10%.

As can be appreciated, the phraseology of English business rules are substantially the same as the phraseology of the relevant legislation. Thus, the English business rules are advantageously human readable without any prior knowledge of the rule-based programming code that operates within the rule engine 60. In addition, the English business rules are advantageously auditable by those familiar with the phraseology, vocabulary and terminology associated with legislation relevant to the relevant financial transaction.

The natural language processor 40 uses the parts of speech definitions to generate rule-based programming code 62, which is comprised of one or more programming concepts, and which is based on the English business rule. In the example, the rule-based programming code is as follows:

Loan_APR>PrimeRate+10.

In this example, the two programming concepts comprising the rule-based programming code are Loan_APR and PrimeRate.

Returning to FIG. 3, the rule engine 60 also includes a mapping 64 of each of the programming concepts to a corresponding function that is executed by the application server 80. In the example, the Loan_APR programming concept is mapped to the getApr( ) function that is implemented in a conventional object oriented programming language executed on the application server. The getApr( ) function is associated with the transaction object, i.e., Loan, that is instantiated by the application server 80 and is based on the terms of the loan being analyzed, which are stored in the application database 26.

Similarly, the PrimeRate programming concept is mapped to the getPrime( ) function that is implemented in a conventional programming language executed on the application server. The getPrime( ) function is also associated with the Loan object, which is instantiated by the application server 80.

Returning to FIG. 4, the system's ability to make basic comparisons and perform mathematical operations enables authoring of English business rules that use substantially the same phraseology of the relevant legislation. Such comparisons may include whether one value exceeds another value, and can be defined with phraseology such as "a real number exceeds a real number." Thus, an English business rules can state a condition such as "if the APR of the loan exceeds the prime rate as of the closing date of the loan," and the application server will execute the appropriate code to determine whether the condition is true or not. In the example, a function that compares two values "x" and "y" that is executed on the application server isGreaterThan(x,y).

Returning to FIG. 3, the rule engine 60 is in electronic communication with the application server 80, and directs the application server 80 to execute the code associated with the getApr( ) function and return a value to the rule engine 60 that represents the annual percentage rate of the instantiated Loan object. The rule engine 60 uses the value returned by the getApr( ) function in the rule-based programming code to evaluate whether the condition Loan_APR>PrimeRate+10 is true or not. As can be appreciated, in order evaluate the condition, the rule engine 60 directs the application server 80 to execute the code associated with the getPrime( ) function. Again, the application server 80 executes the programming code associated with the getPrime( ) function and return a value to the rule engine 60 that represents the prime rate. As mentioned above, information about the prime rate may be stored in the application database 26.

Returning to FIG. 3, as the rule engine 60 uses the values returned by the application server to evaluate whether the condition Loan_APR>PrimeRate+10 is true or not. After the rule engine determines whether the condition is true, that information is communicated by the rule engine 60 to the application server 80. In the example, the annual percentage rate of the loan being analyzed is greater than the prime rate on the closing date plus 10%. Thus, in the example, the annual percentage rate of the loan exceeds the maximum threshold established by the relevant legislation and, the loan may be deemed to fail the APR threshold test. Because the loan "failed" the APR test, the system may classify the loan as a restricted loan. A restricted loan could be, for example, a "high cost" mortgage, and if the loan is so classified, it must comply with the relevant legislation regarding "high cost" mortgages. Based on the compliance determination received from the rule engine 60, the application server outputs the determination in a findings report 140, for example. The output of the application server 80 is discussed in more detail below.

If the loan is classified as a high cost mortgage, the relevant legislation may impose one or more restrictions on the terms of the loan. For example, the relevant legislation may prohibit a balloon payment for a loan that reaches maturity in less than predetermined number of months, 36 months, for example. Another restriction imposed by the relevant legislation may be that the lender cannot finance fees in excess of a certain predefined percentage of the loan amount. Other restrictions may be that the prepayment term cannot exceed a predetermined number of months, the borrowers debt-to-income ratio cannot exceed a predetermined percentage, the lender cannot finance any single-premium credit insurance, the grace period for late payment cannot be less than a predetermined number of days and late fees cannot exceed a predetermined percentage of the loan amount and/or the monthly payment.

Summary Findings Report

FIG. 5 illustrates the output of the application server in the form of an exemplary summary findings report. As can be appreciated, the output of the application server can take any number of known formats, such as displaying the output on a video monitor or printing the output and the invention is not limited to any particular format. As explained above, the rule engine can perform various individual tests on the loan being analyzed to determine whether the loan must and does comply with the relevant legislation. Based on the calculations by the rule engine, various determinations arrived at by the rule engine are displayed, for example, in a summary findings report as illustrated by FIG. 5. As to each test performed by the rule engine, a status or finding is assigned based on the determinations made by the rule engine. For each test, several different statuses are possible, depending on the particular determination reached by the rule engine.

Continuing with the example, as illustrated in FIG. 5, the exemplary loan is designated as a "high cost" mortgage because, as discussed above, the condition for determining whether the loan is a high cost mortgage was satisfied, i.e., the condition Loan_APR>PrimeRate+10 evaluated to true. Thus, the summary findings report of FIG. 5 displays a "YES" value for the "finding" designated as "High Cost Mortgage." Thus, the loan being analyzed must comply with the relevant legislation because it is a "High Cost Mortgage," as defined in the relevant legislation.

As illustrated by FIG. 5, there may be a plurality of tests performed with the respect to the given financial transaction. Each test performed is reflected on the summary findings report and along with the finding or status for each test, which is based on the determinations made by the rule engine. The statuses for the additional tests, which are illustrated by the summary findings report of FIG. 5, may include "PASS" and "FAIL," as well as "N/A,", which indicates that a particular test is not applicable to the particular loan being analyzed by the system. The system also can have, for example, an "ALERT" status, which may indicate, for example, that certain additional disclosures may be required because the loan is considered to be a "high cost" mortgage.

In an embodiment, all the individual findings by the rule engine are grouped by the relevant legislation. Returning to the example and FIG. 5, the relevant legislation is denominated as "Federal Regulations." If there is additional legislation that is relevant to the given loan, then the summary findings report will display the findings associated with additional relevant legislation as well.

As can be appreciated, the application server can be configured to control which findings that are displayed in the summary findings report based on the jurisdiction of the legislation and the terms of the loan. More specifically, the location of the property with which the loan is associated affect the determination as to whether the loan must comply with particular legislation.

Reason Text Database

Figure 6:
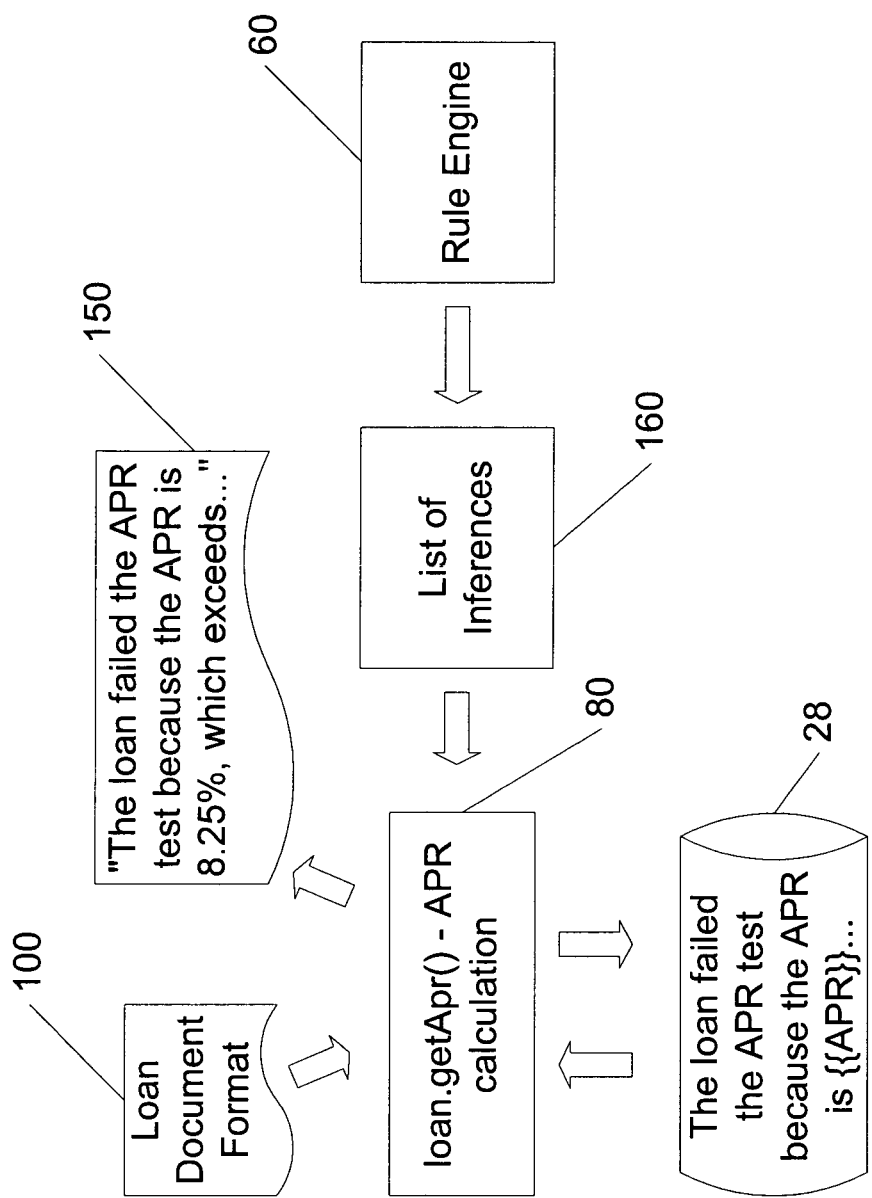
FIG. 6 illustrates the reason text database and the interaction of the reason text database with the application server and the rule engine.

The system and method of the present invention advantageously includes a reason text database, which maybe included within the storage subsystem. FIG. 6 illustrates the reason text database 28 and the interaction of the reason text database 28 with the application server 80 and rule engine 60. The use of a reason text database advantageously permits the application server 80 to generate a detailed findings report 150. The detailed findings report itself will be discussed in more detail below.

As shown in FIG. 6, the detailed findings report 150 is generated by the application server 80 based on the determinations, or inferences 160, made by the rule engine 80. As can been seen from FIG. 6, the application server 80 receives a list of inferences 160 from the rule engine 60. These inferences are determined by the execution of the English business rules by the rule engine 60. The reason text database 28 includes one or more text templates. In an embodiment, there is a text template for each inference, or finding, and a status for the inference, such as test, finding, or alert. The application server 80 receives the list of inferences and accesses the text template associated with the inference for inclusion in the summary findings report 150. The application server 80 also includes any variables that represent calculations or external data that is used in the determination of the inference, and includes such variables in the summary findings report 150. In the example illustrated in FIG. 6, the reason text database 28 contains a text template for the annual percentage rate test. The variable APR (annual percentage rate) is designated as a variable in the reason text database 28 by the pair of brackets. The application server 80 retrieves the actual value for the APR variable and replaces the variable designation with the actual value used by the system in its determination of the resulting status for the APR test. The application server 80 then generates a detailed findings report 150, which includes the appropriate text template and one or more actual calculated or determined values for any variable present in the text template.

Detailed Findings Report

FIG. 7 illustrates an exemplary detailed findings report that is generated by the application server using the reason text database. As shown by FIG. 7, the exemplary detailed findings report provides text setting forth the reason that certain findings were made by the system, including details regarding the calculations and data that was used to make the findings. For example, as described above, the APR for the loan being analyzed was calculated by the application server. The detail findings report displays the APR calculated by the application server. Also, the application server accessed prime rate information that is stored on the application database. As can be seen from FIG. 6, the detailed findings report also displays the prime rate that was in effect as of the closing date of the loan. As was the case with the summary findings report, which is discussed above, the detailed findings report also may include, for example, an "ALERT" status, which may indicate, for example, that certain additional disclosures may be required because the loan is considered to be a "high cost" mortgage. Such an "ALERT" status indicates the existence of any summary items, workflows, warnings, or other such non-quantifiable items. In the example, additional disclosures are required because the loan is assigned the "high cost" mortgage classification. Information as to whether such additional disclosures has been made is not stored with the data about the terms of the loan data, and therefore the finding has a non-quantifiable "ALERT" status, rather than one of the other quantifiable statuses discussed above.

While preferred embodiments of the present invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed is:

1. A computer-based system for automatically determining whether a given financial transaction must comply with relevant legislation, comprising:
   (a) a storage subsystem, the storage subsystem comprising:
      (i) at least one business rule, wherein the business rule determines whether the given financial transaction must comply with relevant legislation using substantially the same phraseology used by the relevant legislation;
      (ii) a knowledge base, wherein a mapping for each of the plurality of business rules corresponding to one or more transaction objects representing the given financial transaction are stored in the knowledge base; and
      (iii) an application database, wherein the application database is comprised of:
      (iv) terms of the given financial transaction; and
      (v) other information necessary to determine whether the given financial transaction must comply with the relevant legislation;
   (b) a natural language processor, wherein the natural language processor generates programming code comprised of one or more programming concepts, wherein the programming code implements the at least one business rule, and wherein the programming code is stored in the storage subsystem;
   (c) a rule engine, wherein the rule engine:
      (vi) executes the programming code generated by the natural language processor; and
      (vii) maps each of the programming concepts to one or more functions that are associated with a transaction object representing the given financial transaction; and
   (d) an application server, wherein the application server:
      (i) instantiates the one or more transaction objects representing the given financial transaction based on the terms of the given financial transaction in the application database;
      (ii) executes the one or more functions that are associated with the one or more transaction objects so that the rule engine can make a determination as to whether the given transaction must comply with the relevant legislation; and
      (iii) outputs the determination as to whether the given financial transaction must comply with the relevant legislation.

2. The system of claim 1, wherein the system determines whether the given financial transaction does comply with the relevant legislation in the event that the system determines that the given financial transaction must comply with the relevant legislation.

3. The system of claim 1, wherein the given financial transaction is a loan.

4. The system of claim 3, wherein the loan is a mortgage loan.

5. The system of claim 4, wherein the terms of the mortgage loan are selected from the group consisting of a loan amount, an annual percentage rate, a loan term, points, fees, a designation as to whether points and/or fees are prepaid or financed, a location of property securing the loan, an application date of the loan, a closing date of the loan, a funding date of the loan, a late fee a, a grace period, a maturity length, a balloon payment amount, a prepayment term, a prepayment penalty amount, an application date, a property type, a loan purpose and one or more disclosure delivery dates.

6. The system of claim 4, wherein the determination as to whether the mortgage loan complies with the relevant legislation is based on an assignment of the mortgage loan to one or more classifications included in the relevant legislation.

7. The system of claim 6, wherein one of the classifications included in the relevant legislation is a restricted mortgage loan.

8. The system of claim 7, wherein the output of the system is comprised of a report indicating whether the loan is a restricted mortgage loan.

9. The system of claim 7, wherein the loan is classified as a restricted mortgage loan if the annual percentage rate for the loan is greater than an annual percentage rate threshold specified by the relevant legislation.

10. The system of claim 9, wherein the output of the system is comprised of a report indicating whether the annual percentage rate for the loan is greater than the annual percentage rate threshold specified by the relevant legislation.

11. The system of claim 7, wherein the loan is classified as a restricted mortgage loan if the points and fees for the loan are greater than a points and fees threshold established by the relevant legislation.

12. The system of 11, wherein the output of the system is comprised of a report indicating whether the points and fees for the loan are greater than the points and fees threshold established by the relevant legislation.

13. The system of claim 7, wherein the output of the system is comprised of additional information to be disclosed to a borrower when the loan is determined to be a restricted mortgage loan.

14. The system of claim 7, wherein the output of the system is comprised of one or more requirements established by the relevant legislation that must be met by a lender making the restricted mortgage loan.

15. The system of claim 7, wherein the output of the system is comprised of one or more restrictions that are established by the relevant legislation as to the terms of the restricted mortgage loan.

16. The system of claim 15, wherein a restriction on the restricted mortgage loan is that the term of the restricted mortgage loan cannot be less than a predetermined term threshold.

17. The system of claim 16, wherein the system determines whether the term of the restricted mortgage loan is less than the predetermined term threshold.

18. The system of claim 17, wherein the output of the system is comprised of a report indicating whether the term of the restricted mortgage loan is less than the predetermined term threshold established by the relevant legislation.

19. The system of claim 2, wherein the output of the system is comprised of one or more of the terms of the given financial transaction.

20. The system of claim 19, wherein the storage subsystem is further comprised of a reason text database.

21. The system of claim 20, wherein the output of the system is comprised of reason text for one or more of the determinations, wherein the reason text provides information about the reason for the one or more determination.

22. The system of claim 5, wherein the system determines the relevant legislation based on the location of property securing the loan.

23. The system of claim 5, wherein the system determines the relevant legislation based on the application date of the loan.

24. The system of claim 5, wherein the system determines the relevant legislation based on the closing date of the loan.

25. A computer-based method for automatically determining whether a given financial transaction must comply with relevant legislation, comprising:
   (a) storing in a storage subsystem
      (i) at least one business rule, wherein the business rule determines whether the given financial transaction must comply with relevant legislation using substantially the same phraseology used by the relevant legislation;
      (ii) a knowledge base, wherein a mapping for each of the plurality of business rules corresponding to one or more transaction objects representing the given financial transaction are stored in the knowledge base; and
      (iii) an application database, wherein the application database is comprised of:
      (iv) terms of the given financial transaction; and
      (v) other information necessary to determine whether the given financial transaction must comply with the relevant legislation;
   (b) generating programming code via a natural language processor, the programming code being comprised of one or more programming concepts, wherein the programming code implements the at least one business rule, and wherein the programming code is stored in the storage subsystem;
   (c) executing the programming code via a rule engine;
   (d) mapping via the rule engine each of the programming concepts to one or more functions that are associated with a transaction object representing the given financial transaction;
   (e) instantiating via an application server the one or more transaction objects representing the given financial transaction based on the terms of the given financial transaction in the application database;
   (f) executing via the application server the one or more functions that are associated with the one or more transaction objects so that the rule engine can make a determination as to whether the given transaction must comply with the relevant legislation; and
   (g) outputting via the application server the determination as to whether the given financial transaction must comply with the relevant legislation.

26. The method of claim 25, further comprising determining whether the given financial transaction does comply with the relevant legislation in the event that the system determines that the given financial transaction must comply with the relevant legislation.

27. The method of claim 25, wherein the given financial transaction is a loan.

28. The method of claim 27, wherein the loan is a mortgage loan.

29. The method of claim 28, wherein the terms of the mortgage loan are selected from the group consisting of a loan amount, an annual percentage rate, a loan term, points, fees, a designation as to whether points and/or fees are prepaid or financed, a location of property securing the loan, an application date of the loan, a closing date of the loan, a funding date of the loan, a late fee a, a grace period, a maturity length, a balloon payment amount, a prepayment term, a prepayment penalty amount, an application date, a property type, a loan purpose and one or more disclosure delivery dates.

30. The method of claim 28, wherein the determination as to whether the mortgage loan complies with the relevant legislation is based on an assignment of the mortgage loan to one or more classifications included in the relevant legislation.

31. The method of claim 30, wherein one of the classifications included in the relevant legislation is a restricted mortgage loan.

32. The method of claim 31, wherein the output is comprised of a report indicating whether the loan is a restricted mortgage loan.

33. The method of claim 32, wherein the loan is classified as a restricted mortgage loan if the annual percentage rate for the loan is greater than an annual percentage rate threshold specified by the relevant legislation.

34. The method of claim 33, wherein the output is comprised of a report indicating whether the annual percentage rate for the loan is greater than the annual percentage rate threshold specified by the relevant legislation.

35. The method of claim 31, wherein the loan is classified as a restricted mortgage loan if the points and fees for the loan are greater than a points and fees threshold established by the relevant legislation.

36. The method of claim 35, wherein the output is comprised of a report indicating whether the points and fees for the loan are greater than the points and fees threshold established by the relevant legislation.

37. The method of claim 31, wherein the output is comprised of additional information to be disclosed to a borrower when the loan is determined to be a restricted mortgage loan.

38. The method of claim 31, wherein the output is comprised of one or more requirements established by the relevant legislation that must be met by a lender making the restricted mortgage loan.

39. The method of claim 31, wherein the output is comprised of one or more restrictions that are established by the relevant legislation as to the terms of the restricted mortgage loan.

40. The method of claim 39, wherein a restriction on the restricted mortgage loan is that the term of the restricted mortgage loan cannot be less than a predetermined term threshold.

41. The method of claim 40, further comprising determining whether the term of the restricted mortgage loan is less than the predetermined term threshold.

42. The method of claim 41, wherein the output is comprised of a report indicating whether the term of the restricted mortgage loan is less than the predetermined term threshold established by the relevant legislation.

43. The method of claim 26, wherein the output is comprised of one or more of the terms of the given financial transaction.

44. The method of claim 43, further comprising storing a reason text database.

45. The method of claim 44, wherein the output is comprised of reason text for one or more of the determinations, wherein the reason text provides information about the reason for the one or more determination.

46. The method of claim 29, further comprising determining the relevant legislation based on the location of property securing the loan.

47. The method of claim 29, further comprising determining the relevant legislation based on the application date of the loan.

48. The method of claim 29, further comprising determining the relevant legislation based on the closing date of the loan.

49. A computer readable medium containing instructions for automatically determining whether a given financial transaction must comply with relevant legislation, whereby the instructions cause a computer to:
  (a) store in a storage subsystem
    (i) at least one business rule, wherein the business rule determines whether the given financial transaction must comply with relevant legislation using substantially the same phraseology used by the relevant legislation;
    (ii) a knowledge base, wherein a mapping for each of the plurality of business rules corresponding to one or more transaction objects representing the given financial transaction are stored in the knowledge base; and
    (iii) an application database, wherein the application database is comprised of:
      a. terms of the given financial transaction; and
      b. other information necessary to determine whether the given financial transaction must comply with the relevant legislation;
  (b) generate programming code via a natural language processor, the programming code being comprised of one or more programming concepts, wherein the programming code implements the at least one business rule, and wherein the programming code is stored in the storage subsystem;
  (c) execute the programming code via a rule engine;
  (d) maps via the rule engine each of the programming concepts to one or more functions that are associated with a transaction object representing the given financial transaction;
  (e) instantiates via an application server the one or more transaction objects representing the given financial transaction based on the terms of the given financial transaction in the application database;
  (f) executes via the application server the one or more functions that are associated with the one or more transaction objects so that the rule engine can make a determination as to whether the given transaction must comply with the relevant legislation; and
  (g) outputs via the application server the determination as to whether the given financial transaction must comply with the relevant legislation.

50. The computer readable medium of claim 49, wherein the computer readable medium further determines whether the given financial transaction does comply with the relevant legislation in the event that the system determines that the given financial transaction must comply with the relevant legislation.

51. The computer readable medium of claim 50, wherein the given financial transaction is a loan.

52. The computer readable medium of claim 51, wherein the loan is a mortgage loan.

53. The computer readable medium of claim 52, wherein the terms of the mortgage loan are selected from the group consisting of a loan amount, an annual percentage rate, a loan term, points, fees, a designation as to whether points and/or fees are prepaid or financed, a location of property securing the loan, an application date of the loan, a closing date of the loan, a funding date of the loan, a late fee a, a grace period, a maturity length, a balloon payment amount, a prepayment term, a prepayment penalty amount, an application date, a property type, a loan purpose and one or more disclosure delivery dates.

54. The computer readable medium of claim 52, wherein the determination as to whether the mortgage loan complies with the relevant legislation is based on an assignment of the mortgage loan to one or more classifications included in the relevant legislation.

55. The computer readable medium of claim 54, wherein one of the classifications included in the relevant legislation is a restricted mortgage loan.

56. The computer readable medium of claim 55, wherein the output is comprised of a report indicating whether the loan is a restricted mortgage loan.

57. The computer readable medium of claim 56, wherein the loan is classified as a restricted mortgage loan if the annual percentage rate for the loan is greater than an annual percentage rate threshold specified by the relevant legislation.

58. The computer readable medium of claim 57, wherein the output is comprised of a report indicating whether the annual percentage rate for the loan is greater than the annual percentage rate threshold specified by the relevant legislation.

59. The computer readable medium of claim 55, wherein the loan is classified as a restricted mortgage loan if the points and fees for the loan are greater than a points and fees threshold established by the relevant legislation.

60. The computer readable medium of claim 59, wherein the output is comprised of a report indicating whether the points and fees for the loan are greater than the points and fees threshold established by the relevant legislation.

61. The computer readable medium of claim 55, wherein the output is comprised of additional information to be disclosed to a borrower when the loan is determined to be a restricted mortgage loan.

62. The computer readable medium of claim 55, wherein the output is comprised of one or more requirements established by the relevant legislation that must be met by a lender making the restricted mortgage loan.

63. The computer readable medium of claim 55, wherein the output is comprised of one or more restrictions that are established by the relevant legislation as to the terms of the restricted mortgage loan.

64. The computer readable medium of claim 63, wherein a restriction on the restricted mortgage loan is that the term of the restricted mortgage loan cannot be less than a predetermined term threshold.

65. The computer readable medium of claim 64, wherein the computer readable medium further determines whether the term of the restricted mortgage loan is less than the predetermined term threshold.

66. The computer readable medium of claim 64, wherein the output is comprised of a report indicating whether the term of the restricted mortgage loan is less than the predetermined term threshold established by the relevant legislation.

67. The computer readable medium of claim 50, wherein the output is comprised of one or more of the terms of the given financial transaction.

68. The computer readable medium of claim 67, wherein the computer readable medium further stores a reason text database.

69. The computer readable medium of claim 68, wherein the output is comprised of reason text for one or more of the determinations, wherein the reason text provides information about the reason for the one or more determination.

70. The computer readable medium of claim 53, wherein the computer readable medium further determines the relevant legislation based on the location of property securing the loan.

71. The computer readable medium of claim 53, wherein the computer readable medium further determines the relevant legislation based on the application date of the loan.

72. The method of claim 53, wherein the computer readable medium further determines the relevant legislation based on the closing date of the loan.

* * * * *